United States Patent
Yao et al.

(10) Patent No.: US 10,345,657 B2
(45) Date of Patent: Jul. 9, 2019

(54) PIXEL STRUCTURE

(71) Applicant: Shenzhen China Star Optoelectronics Technology Co., Ltd., Shenzhen (CN)

(72) Inventors: Xiaohui Yao, Shenzhen (CN); Bangyin Peng, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 14/897,706

(22) PCT Filed: Oct. 12, 2015

(86) PCT No.: PCT/CN2015/091729
§ 371 (c)(1),
(2) Date: Oct. 3, 2017

(87) PCT Pub. No.: WO2017/049672
PCT Pub. Date: Mar. 30, 2017

(65) Prior Publication Data
US 2018/0052370 A1    Feb. 22, 2018

(30) Foreign Application Priority Data

Sep. 23, 2015 (CN) .......................... 2015 1 0610835

(51) Int. Cl.
*G02F 1/1337*    (2006.01)
*G02F 1/1343*    (2006.01)

(52) U.S. Cl.
CPC ...... *G02F 1/134336* (2013.01); *G02F 1/1343* (2013.01); *G02F 1/13439* (2013.01);
(Continued)

(58) Field of Classification Search
CPC ... G02F 2001/134372; G02F 1/134363; G02F 1/134309
See application file for complete search history.

(56) References Cited

U.S. PATENT DOCUMENTS

| | | | | |
|---|---|---|---|---|
| 4,776,673 A | * | 10/1988 | Aoki | G02F 1/1362 257/350 |
| 2007/0211200 A1 | * | 9/2007 | Lee | G02F 1/1309 349/139 |
| 2009/0207475 A1 | * | 8/2009 | Jung | G02F 1/167 359/296 |

FOREIGN PATENT DOCUMENTS

| | | |
|---|---|---|
| CN | 101114089 A | 1/2008 |
| CN | 103901681 A | 7/2014 |
| JP | 2009-92930 A | 4/2009 |

OTHER PUBLICATIONS

Office Action dated Jun. 21, 2017 by the State Intellectual Property Office of the People's Republic of China in corresponding Chinese Patent Application No. 201510610835.3. (5 pages).

(Continued)

*Primary Examiner* — Alexander P Gross
(74) *Attorney, Agent, or Firm* — Andrew C. Cheng

(57) ABSTRACT

A pixel structure is disclosed. The pixel structure includes first transparent conductive films that are arranged on color-resists of a color filter substrate, and second transparent conductive films that are arranged on sub pixel regions of an array substrate and correspond to the first transparent conductive films. The first transparent conductive films are connected with one another. An area of an orthographic projection of each first transparent conductive film on a corresponding second transparent conductive film is equal to an area of the second transparent conductive film. According to the present disclosure, the pixel structure has a higher light transmittance.

7 Claims, 3 Drawing Sheets

(52) U.S. Cl.
CPC .. *G02F 1/133707* (2013.01); *G02F 1/134309* (2013.01); *G02F 1/133753* (2013.01); *G02F 2001/133757* (2013.01); *G02F 2001/134318* (2013.01); *G02F 2201/122* (2013.01); *G02F 2201/123* (2013.01); *G02F 2203/01* (2013.01)

(56) References Cited

OTHER PUBLICATIONS

Notification of Transmittal of the International Search Report and the Written Opinion of the International Searching Authority (Forms PCT/ISA/237, PCT/ISA/220, and PCT/ISA/210) dated Jun. 24, 2016, by the State Intellectual Property Office of People's Republic of China Patent Office in corresponding International Application No. PCT/CN2015/091729. (12 pages).

\* cited by examiner

PIXEL STRUCTURE

CROSS REFERENCE TO RELATED APPLICATION

The present application claims priority of Chinese patent application CN201510610835.3, entitled "Pixel Structure" and filed on Sep. 23, 2015, the entirety of which is incorporated herein by reference.

FIELD OF THE INVENTION

The present disclosure relates to the technical field of liquid crystal display, and particularly to a pixel structure.

BACKGROUND OF THE INVENTION

According to Ultraviolet induced multi-domain Vertical Alignment (UV2A) technology, an inclining direction of liquid crystal molecules can be controlled with high accuracy along a direction of ultraviolet taking advantage of an alignment film which is made of a special polymer material. The basic principle of UV2A technology is stated as follows. A glass substrate is coated with a special alignment film which has a response to ultraviolet. When ultraviolet irradiates the alignment film, it will deflect along the irradiation direction, so that the liquid crystal molecules can be inclined along the irradiation direction of ultraviolet. The product which is produced through UV2A technology has a high aperture ratio, a high picture contrast, and a high response speed.

As shown in FIGS. 6 and 7, when a traditional pixel structure 100' is applied with UV2A technology, taking the alignment mode as shown in FIG. 6 as an example (as shown by the solid arrows in FIG. 6), black stripes 10' as shown in FIG. 7 would be generated. As shown in FIG. 7, due to the action of fringe electric field at edges of the pixel structure 100' (as shown by the solid arrows in FIG. 7), the liquid crystal molecules all incline from the edges of the pixel structure 100' to an inside part thereof (as shown by the dotted arrows in FIG. 7). When an angle between a direction of an action force of the fringe electric field and a rotation direction of the liquid crystal molecules is less than 90°, the edges of the pixel structure 100' will not be shaded by the liquid crystal molecules, and thus no black stripe 12' would be generated. When the angle between the direction of the action force of the fringe electric field and the rotation direction of the liquid crystal molecules is larger than 90°, the edges of the pixel structure 100' will be shaded by the liquid crystal molecules, and thus the black stripe 12' would be generated.

In general, in one pixel structure 100', the black stripes 10' comprise an orthogonal stripe 11' at a middle part thereof, and an edge black stripe 12' with a length being a half of a length of a corresponding edge of the pixel structure 100' at the edge thereof. With respect to the black stripes 10', the orthogonal stripe 11' exists inevitably due to the special orthogonal optical alignment mode of the UV2A technology and cannot be eliminated, but the edge black stripe 12' can be regulated through regulating the pixel structure 100'. If the edge black stripe 12' can be eliminated, a light transmittance of the pixel structure 100' can be greatly improved.

With respect to the aforesaid technical problem in the prior art, a pixel structure in which less black stripe would be generated at the edges thereof, and the light transmittance thereof can be improved is needed.

SUMMARY OF THE INVENTION

With respect to the technical defect in the prior art, the present disclosure provides a pixel structure.

According to the present disclosure, the pixel structure comprises first transparent conductive films that are arranged on color-resists of a color filter substrate, and second transparent conductive films that are arranged on sub pixel regions of an array substrate and correspond to the first transparent conductive films. The first transparent conductive films are connected with one another. An area of an orthographic projection of each first transparent conductive film on a corresponding second transparent conductive film is equal to an area of the second transparent conductive film.

In traditional pixel structure, the area of each first transparent conductive film is larger than the area of a corresponding second transparent conductive film. When UV2A technology is used, an additional black stripe would be generated at the edge of the first transparent conductive film due to the fringe electric field effect thereof. In the pixel structure according to the present disclosure, the area of the orthographic projection of each first transparent conductive film on a corresponding second transparent conductive film is arranged to be equal to the area of the second transparent conductive film, so that an opening area of the first transparent conductive film can be reduced. In this manner, the generation of black stripe at the edge of the first transparent conductive film can be prevented, and a light transmittance of the pixel structure can be improved.

According to some embodiments, the first transparent conductive film and the second transparent conductive film both have a same rectangular shape. With this arrangement, a high light transmittance of the first transparent conductive film can be realized in the simplest manner.

According to some embodiments, one edge of four edges of the first transparent conductive film is arranged as a curved edge, or a plurality of edges of the four edges of the first transparent conductive film are arranged as curved edges. The curved edge can better fit with a shape of the black stripe generated at the edge of the first transparent conductive film due to the fringe electric field effect thereof. That is, the black stripe at the edge of the first transparent conductive film can be further shaded by the curved edge, so that the black stripe at the edge of the first transparent conductive film can be further removed out of an opening area thereof, and the black stripe can be further reduced accordingly.

According to some embodiments, each of the four edges of the first transparent conductive film is arranged as a curved edge. According to this technical solution, the black stripe at each of the four edges of the first transparent conductive film can be reduced. That is, the black stripe can be further reduced.

According to some embodiments, the curved edge is arranged between one end of an edge of the first transparent conductive film and a midpoint of the edge of the first transparent conductive film. Since the black stripe with a length being a half of a length of an edge of the first transparent conductive film is generated at the corresponding edge thereof, the black stripe does not appear on the first transparent conductive film any more through arranging a curved edge at a position where the black stripe would otherwise be generated. It should be noted that, the formation of the black stripe relates to a quantity of an alignment region. In one alignment region, liquid crystal molecules have a same initial alignment direction, and the liquid crystal molecules would incline towards the initial alignment direction when a voltage is applied thereon. However, different alignment regions have different initial alignment directions, and thus the specific radian and shape of the curved edge should be arranged according to the specific alignment mode.

According to some embodiments, the curved edges are not connected with one another. Since the black stripes that are generated at the edges of the first transparent conductive film do not interfere with one another, the curved edges are arranged in a same way. Therefore, the black stripe at the edge of the pixel structure can be eliminated.

According to some embodiments, the first transparent conductive films are connected with one another through a material the same as the transparent conductive film. This technical solution can be realized through removing part of material from the first transparent conductive film in the traditional pixel structure.

According to some embodiments, two adjacent first transparent conductive films are connected with each other through two midpoints at two adjacent edges thereof. This technical solution can be realized easily, and a good stability of a connection among the first transparent conductive films can be obtained.

According to some embodiments, any four of the first transparent conductive films which are distributed in a matrix are connected with one another through four corners thereof in a cross manner. According to this technical solution, the first transparent conductive films can be connected with one another in a simple manner, and four first transparent conductive films can be connected with one another only through two connection steps.

According to some embodiments, two adjacent first transparent conductive films are also connected with each other through two midpoints at two adjacent edges thereof. According to this technical solution, the stability of the connection among the first transparent conductive films can be improved.

Compared with the prior art, in the pixel structure according to the present disclosure, the area of the orthographic projection of each first transparent conductive film on a corresponding second transparent conductive film is arranged to be equal to the area of the second transparent conductive film, so that an opening area of the first transparent conductive film can be reduced. In this manner, the generation of black stripe at the edge of the first transparent conductive film can be prevented, and a light transmittance of the pixel structure can be improved. According to the present disclosure, the pixel structure can be manufactured based on the traditional pixel structure, so that a production efficiency of the pixel structure can be improved, and a production cost thereof can be reduced.

BRIEF DESCRIPTION OF THE DRAWINGS

The present disclosure will be illustrated in detail hereinafter with reference to the embodiments and the drawings. In the drawings.

Figure 1:
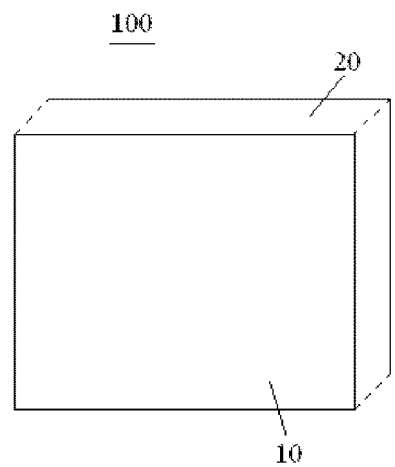
FIG. 1 schematically shows part of a pixel structure according to the present disclosure.

In the drawings, a same component is represented by a same reference sign. The drawings are not drawn according to actual scale.

DETAILED DESCRIPTION OF THE EMBODIMENTS

The present disclosure will be further illustrated hereinafter with reference to the drawings.

The details described herein are only specific examples used for discussing the implementations of the present disclosure. The most useful and most understandable description on the principle and concept of the present disclosure is provided. The structural details which go beyond the scope of basic understanding of the present disclosure are not provided herein. Therefore, those skilled in the art can clearly understand, based on the description and the accompanying drawings, how to implement the present disclosure in different ways.

FIG. 1 schematically shows part of a pixel structure 100 according to the present disclosure. The pixel structure 100 comprises first transparent conductive films 10 that are arranged on color-resists of a color filter substrate, and second transparent conductive films 20 that are arranged on a sub pixel region of an array substrate and correspond to the first transparent conductive films 10. The first transparent conductive films 10 are connected with one another. An area of an orthographic projection of each first transparent conductive film 10 on a corresponding second transparent conductive film 20 is equal to an area of the second transparent conductive film 20.

In traditional pixel structure, the area of each first transparent conductive film is larger than the area of a corresponding second transparent conductive film. When UV2A technology is used, an additional black stripe would be generated at the edge of the first transparent conductive film due to the fringe electric field effect thereof. In the pixel structure 100 according to the present disclosure, the area of the orthographic projection of each first transparent conductive film 10 on a corresponding second transparent conductive film 20 is arranged to be equal to the area of the second transparent conductive film 20, so that an opening area of the first transparent conductive film 10 can be reduced. In this manner, the generation of black stripe at the edge of the first transparent conductive film 10 can be prevented, and a light transmittance of the pixel structure 100 can be improved.

According to the embodiment as shown in FIG. 1, the first transparent conductive film 10 and the second transparent conductive film 20 both have a same rectangular shape. With this arrangement, a high light transmittance of the first transparent conductive film 10 can be realized in the simplest manner.

Figure 2:
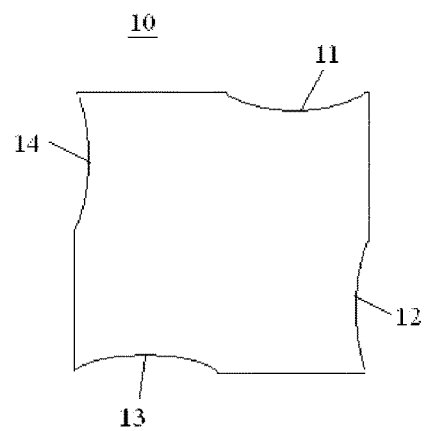
FIG. 2 schematically shows a first transparent conductive film in the pixel structure according to the present disclosure.

As shown in FIG. 2, one edge of four edges of the first transparent conductive film 10 is arranged as a curved edge, or a plurality of edges of the four edges of the first transparent conductive film 10 are arranged as curved edges. The curved edge can better fit with a shape of the black stripe generated at the edge of the first transparent conductive film 10 due to the fringe electric field effect thereof. That is, the black stripe at the edge of the first transparent conductive film 10 can be further shaded by the curved edge, so that the black stripe at the edge of the first transparent conductive film 10 can be further removed out of an opening area thereof, and the black stripe can be further reduced accordingly.

Preferably, according to the embodiment as shown in FIG. 2, the four edges of the first transparent conductive film 10 are arranged as curved edge 11, curved edge 12, curved edge 13, and curved edge 14 in sequence in clockwise direction. The curved edge is arranged between one end of an edge of the first transparent conductive film 10 and a midpoint of the edge of the first transparent conductive film 10. Since the black stripe with a length being a half of a length of an edge of the first transparent conductive film 10 is generated at the corresponding edge thereof, the black stripe does not appear on the first transparent conductive film 10 any more through arranging a curved edge at a position where the black stripe would otherwise be generated.

According to this technical solution, the black stripe at each of the four edges of the first transparent conductive film 10 can be reduced. That is, the black stripe can be further reduced.

It should be noted that, the formation of the black stripe relates to a quantity of an alignment region. In one alignment region, liquid crystal molecules have a same initial alignment direction, and the liquid crystal molecules would incline towards the initial alignment direction when a voltage is applied thereon. However, different alignment regions have different initial alignment directions, and thus the specific radian and shape of the curved edge should be arranged according to the specific alignment mode.

Preferably, the curved edge 11, curved edge 12, curved edge 13, and curved edge 14 are not connected with one another. Since the black stripes that are generated at the edges of the first transparent conductive film 10 do not interfere with one another, the curved edges are arranged in a same way. Therefore, the black stripe at the edge of the pixel structure 100 can be eliminated.

According to the present disclosure, the first transparent conductive films 10 are connected with one another through a material the same as the transparent conductive film. This technical solution can be realized through removing part of material from the first transparent conductive film 10 in the traditional pixel structure.

Figure 3:
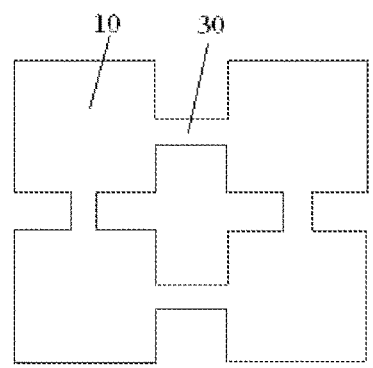
FIG. 3 schematically shows a connection among the first transparent conductive films according to a first embodiment.

For example, according to the embodiment as shown in FIG. 3, two midpoints at two adjacent edges of two adjacent first transparent conductive films 10 are connected with each other through a connection part 30. This technical solution can be realized easily, and a good stability of a connection among the first transparent conductive films 10 can be obtained.

Figure 4:
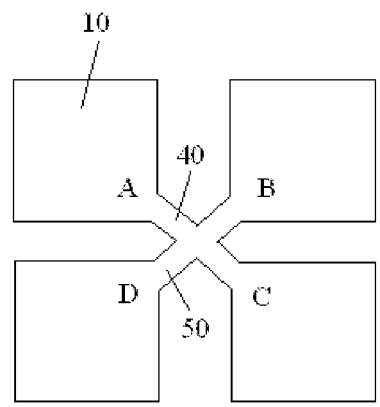
FIG. 4 schematically shows a connection among the first transparent conductive films according to a second embodiment.

For another example, according to the embodiment as shown in FIG. 4, any four of the first transparent conductive films 10 which are distributed in a matrix are connected with one another through four corners thereof in a cross manner. That is, corner A and corner C are connected with each other through a connection part 40, and corner B and corner D are connected with each other through a connection part 50. According to this technical solution, the first transparent conductive films 10 can be connected with one another in a simple manner, and four first transparent conductive films 10 can be connected with one another only through two connection steps.

Figure 5:
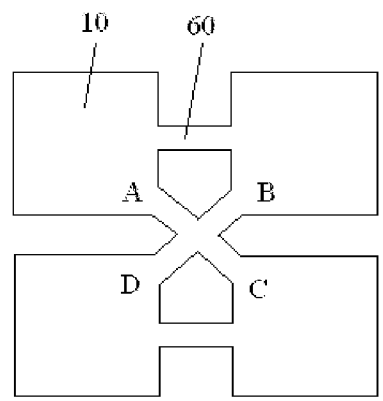
FIG. 5 schematically shows a connection among the first transparent conductive films according to a third embodiment.
Figure 6:
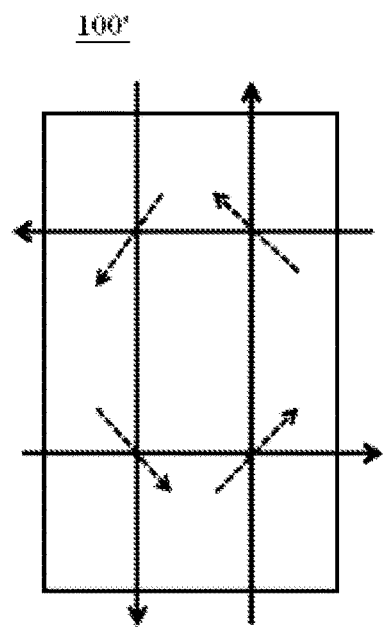
FIG. 6 schematically shows an alignment mode of a pixel structure in the prior art when UV2A technology is used.
Figure 7:
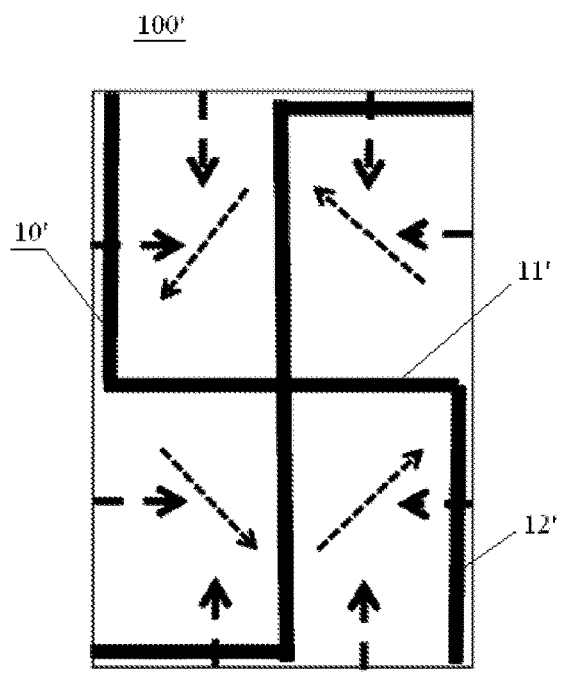
FIG. 7 schematically shows black stripes formed on the pixel structure in the prior art.

Preferably, according to the embodiment as shown in FIG. 5, two midpoints at two adjacent edges of two adjacent first transparent conductive films 10 are also connected with each other through a connection part 60 after corner A and corner C being connected with each other and corner B and corner D being connected with each other. According to this technical solution, the stability of the connection among the first transparent conductive films can be improved.

Compared with the prior art, in the pixel structure 100 according to the present disclosure, the area of the orthographic projection of each first transparent conductive film 10 on a corresponding second transparent conductive film 20 is arranged to be equal to the area of the second transparent conductive film 20, so that an opening area of the first transparent conductive film 10 can be reduced. In this manner, the generation of black stripe at the edge of the first transparent conductive film 10 can be prevented, and a light transmittance of the pixel structure 100 can be improved. It is shown by simulation of software that, the light transmittance of the pixel structure 100 according to the present disclosure can be improved by 3.5% compared with the traditional pixel structure. According to the present disclosure, the pixel structure 100 can be manufactured based on the traditional pixel structure, so that a production efficiency of the pixel structure 100 can be improved, and a production cost thereof can be reduced.

It should be noted that, the above embodiments are described only for better understanding, rather than restricting the present disclosure. Those skilled in the art can make amendments to the present disclosure within the scope as defined in the claims and without departing from the spirit and scope of the present disclosure. The present disclosure is described according to specific methods, materials, and implementations, but the present disclosure is not restricted by the details disclosed herein. On the contrary, the present disclosure is applicable for the equivalent structures, methods, and applications with the same functions as those defined in the claims.

The invention claimed is:

1. A pixel structure, comprising:
    first transparent conductive films that are arranged on color-resists of a color filter substrate; and
    second transparent conductive films that are arranged on sub pixel regions of an array substrate and correspond to the first transparent conductive films,
    wherein the first transparent conductive films are connected with one another;
    wherein an area of an orthographic projection of each first transparent conductive film on a corresponding second transparent conductive film is equal to an area of the second transparent conductive film;
    wherein the first transparent conductive film and the second transparent conductive film both have a same rectangular shape; and
    wherein one edge of four edges of the first transparent conductive film is arranged as a combination of a curved edge section and a straight edge section, or a plurality of edges of the four edges of the first transparent conductive film are each arranged as a combination of a straight edge section and a curved edge section, wherein the curved edge section is arranged between a first one of two opposite ends of an edge of the first transparent conductive film and a midpoint of the edge of the first transparent conductive film and the straight edge section is arranged between the midpoint of the edge of the first transparent conductive film and a second one of the two opposite ends of the edge of the transparent conductive film, the straight edge section and the curved edge section each occupying one half of a length of the edge of the first transparent conductive film.

2. The pixel structure according to claim 1, wherein the curved edge sections are not connected with one another.

3. The pixel structure according to claim 2, wherein the curved edge sections are not connected with one another and are separate from one another by the straight edge sections.

4. The pixel structure according to claim 1, wherein the first transparent conductive films are connected with one another through a material the same as the transparent conductive film.

5. The pixel structure according to claim 4, wherein two adjacent first transparent conductive films are connected with each other through two midpoints at two adjacent edges thereof.

6. The pixel structure according to claim 4, wherein any four of the first transparent conductive films which are distributed in a matrix are connected with one another through four corners thereof in a cross manner.

7. The pixel structure according to claim 6, wherein two adjacent first transparent conductive films are also connected with each other through two midpoints at two adjacent edges thereof.

* * * * *